US 11,380,088 B2

(12) United States Patent
Iida et al.

(10) Patent No.: US 11,380,088 B2
(45) Date of Patent: Jul. 5, 2022

(54) POSITION DETECTING METHOD AND POSITION DETECTING DEVICE

(71) Applicant: TOYOTA JIDOSHA KABUSHIKI KAISHA, Toyota (JP)

(72) Inventors: Yasuhiro Iida, Toyota (JP); Tomohito Enoki, Toyota (JP); Takashi Matsuura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 16/704,597

(22) Filed: Dec. 5, 2019

(65) Prior Publication Data

US 2020/0193216 A1 Jun. 18, 2020

(30) Foreign Application Priority Data

Dec. 12, 2018 (JP) .............................. JP2018-232227

(51) Int. Cl.
*G06V 10/00* (2022.01)
*G06V 10/75* (2022.01)
(Continued)

(52) U.S. Cl.
CPC .......... *G06V 10/758* (2022.01); *B29C 31/004* (2013.01); *B29C 70/682* (2013.01); *B29C 70/86* (2013.01)

(58) Field of Classification Search
CPC .... G06V 10/758; G06V 10/60; B29C 31/004; B29C 70/682; B29C 70/86; B29C 53/602;
(Continued)

(56) References Cited

U.S. PATENT DOCUMENTS

| 4,276,910 A | 7/1981 | Eichenberger |
| 7,413,717 B2* | 8/2008 | Hirai .................... C04B 38/0009 422/177 |
| 2009/0121728 A1* | 5/2009 | Uozumi .............. B29C 53/8066 356/630 |

FOREIGN PATENT DOCUMENTS

| CN | 105115981 A | 12/2015 |
| CN | 107539815 A | 1/2018 |

(Continued)

OTHER PUBLICATIONS

Partial translation of Chinese Office Action dated Apr. 23, 2021, for Chinese patent application No. 201911237584.3.

*Primary Examiner* — Neil R McLean
(74) *Attorney, Agent, or Firm* — Dickinson Wright PLLC (57) ABSTRACT

Provided is a position detecting method for detecting a winding position of a reinforced fiber impregnated with resin when a plurality of hoop layers is formed in a cylindrical portion of a liner. The position detecting method includes: an imaging step of taking, by an imaging portion, a captured image of the reinforced fiber just after the reinforced fiber is wound around a hoop layer illuminated with oblique light by a lighting assembly, the imaging portion having an optical axis set at the same angle as an optical axis of the lighting assembly around a central axis of the liner; and a detecting step of detecting the winding position of the reinforced fiber based on the number of high intensity pixels or the number of low intensity pixels in each pixel column arranged in an axial direction of the liner in the binarized captured image.

10 Claims, 8 Drawing Sheets

(51) Int. Cl.
*B29C 31/00* (2006.01)
*B29C 70/68* (2006.01)
*B29C 70/86* (2006.01)

(58) Field of Classification Search
CPC ......... B29C 70/54; B29C 70/32; G01B 11/00; G01B 11/02
USPC ....................................................... 382/165
See application file for complete search history.

(56) References Cited

FOREIGN PATENT DOCUMENTS

| | | | |
|---|---|---|---|
| JP | H04298443 | A | 10/1992 |
| JP | 2010078545 | A | 4/2010 |
| JP | 2013075326 | A | 4/2013 |
| JP | 2017226150 | A | 12/2017 |

* cited by examiner

FIG. 8

POSITION DETECTING METHOD AND POSITION DETECTING DEVICE

INCORPORATION BY REFERENCE

The disclosure of Japanese Patent Application No. 2018-232227 filed on Dec. 12, 2018 including the specification, drawings and abstract is incorporated herein by reference in its entirety.

BACKGROUND

1. Technical Field

The disclosure relates to a position detecting method and a position detecting device.

2. Description of Related Art

As a high-pressure tank, there has been known a tank configured such that a liner filled with high-pressure fluid such as gas is reinforced by a reinforced fiber from outside. In a manufacturing process of such a high-pressure tank, a reinforced fiber impregnated with resin is wound around the outer surface of the liner several times by a so-called filament winding method (hereinafter referred to as the FW method). There has been known a technique in which, at the time when the reinforced fiber is wound around a tubular product such as a tank, a fiber width is measured while a captured image of a winding position of the reinforced fiber is taken (e.g., see Japanese Unexamined Patent Application Publication No. 2010-78545 (JP 2010-78545 A)). In the measuring method described in JP 2010-78545 A, a fiber in an upper layer and a fiber in a lower layer have different winding angles, so that the fiber width of the reinforced fiber is measured from a difference in light reflection intensity due to a difference in winding angle.

SUMMARY

Further, there is a demand to detect a winding position of the reinforced fiber during hoop winding, as well as detection of an end position of a hoop layer. For example, the winding position of the reinforced fiber during the hoop winding can be estimated from a moving position of an abutment joint that leads the reinforced fiber to the outer surface of the liner, or the like. However, if an actual winding position of the reinforced fiber can be detected accurately, a more precise control is performable by use of a detection result. In this case, such a method is conceivable that the method described in JP 2010-78545 A is applied so as to optically detect the winding position of the reinforced fiber during the hoop winding. However, in the method described in JP 2010-78545 A, the difference in winding angle between the fiber in the upper layer and the fiber in the lower layer is used. Accordingly, the method cannot be applied to hoop winding in which the fiber in the upper layer and the fiber in the lower layer have generally the same reinforced-fiber winding angle.

An object of the disclosure is to provide a position detecting method and a position detecting device each of which can detect a winding position of a reinforced fiber during hoop winding at the time when a plurality of hoop layers is formed on the outer surface of a liner.

In order to achieve the above object, a position detecting method according to the disclosure is a position detecting method for detecting a winding position of a reinforced fiber impregnated with resin when a plurality of hoop layers is formed in a cylindrical portion of a liner by winding the reinforced fiber around the cylindrical portion in hoop winding with the winding position of the reinforced fiber reciprocating in an axial direction of the liner. The position detecting method includes: an imaging step of illuminating, by a lighting assembly, a hoop layer with oblique light from a direction inclined from a central axis of the liner and taking, by an imaging portion, a captured image of the reinforced fiber just after the reinforced fiber is wound around the hoop layer illuminated with oblique light by the lighting assembly, the imaging portion having an optical axis set at the same angle as an optical axis of the lighting assembly around the central axis of the liner; and a detecting step of binarizing the captured image taken by the imaging portion to high intensity pixels and low intensity pixels and detecting the winding position of the reinforced fiber based on the number of high intensity pixels or the number of low intensity pixels in each pixel column arranged in the axial direction of the liner in the binarized captured image.

With this configuration, when the hoop layer is illuminated with oblique light by the lighting assembly from the direction inclined from the central axis of the liner in the imaging step, a light reflection region observed by the imaging portion becomes narrow in the fiber direction of the reinforced fiber as time elapses from the point of winding of the reinforced fiber. In the binarized captured image, the fiber direction of the reinforced fiber corresponds to a column direction of each pixel column arranged in the axial direction of the liner. As compared with the reinforced fiber after time has elapsed sufficiently from the point of winding, the reinforced fiber just after winding appears as a pixel column with a large number of high intensity pixels or a pixel column with a small number of low intensity pixels. In the meantime, as compared with the reinforced fiber just after winding, the reinforced fiber after time has elapsed sufficiently from the point of winding appears as a pixel column with a small number of high intensity pixels or a pixel column with a large number of low intensity pixels. Accordingly, at the time when a plurality of hoop layers is formed in the detecting step, the reinforced fiber in a lower layer after time has elapsed sufficiently from the point of winding and the reinforced fiber in an upper layer just after winding can be distinguished from each other, so that the winding position of the reinforced fiber just after winding can be detected from the captured image.

As a more preferable aspect, in the imaging step, a plurality of captured images of the reinforced fiber just after the reinforced fiber is wound around the hoop layer may be taken before and after a return operation of reversing a moving direction of the winding position of the reinforced fiber. In the detecting step, an end position of the hoop layer may be detected as the winding position of the reinforced fiber from the captured images taken before and after the return operation. With this configuration, it is possible to detect the end position of the hoop layer from the captured images taken before and after the return operation in the detecting step with accuracy.

As a more preferable aspect, the position detecting method may further include a determination step of determining whether the end position of the hoop layer falls within a standard range based on a target end position. In the determination step, when the end position of the hoop layer falls within the standard range, the hoop winding may be continued, and when the end position of the hoop layer deviates from the standard range, the hoop winding may be stopped. With this configuration, in the determination step, it is automatically determined whether or not the end position of the hoop layer deviates from the standard range, during the hoop winding, and when the end position of the hoop layer deviates from the standard range, the manufacture is stopped, so that an operator can perform maintenance at the early stage.

The configuration is not particularly limited, provided that the winding position of the reinforced fiber can be detected. As a more preferable aspect, in the detecting step, the rate of the high intensity pixel may be calculated for each pixel column in the binarized captured image in order from outside to inside in the axial direction of the liner. The winding position of the reinforced fiber may be detected based on a pixel column in which the rate of the high intensity pixel exceeds a specific rate first. With this configuration, the winding position of the reinforced fiber can be detected from the rate of the high intensity pixel in each pixel column in the detecting step.

As a more preferable aspect when the winding position of the reinforced fiber is detected based on the specific rate, in the detecting step, when the number of continuous pixel columns in which the rate of the high intensity pixel exceeds the specific rate is a specific number or more, the winding position of the reinforced fiber may be detected based on the pixel column in which the rate of the high intensity pixel exceeds the specific rate first from among the continuous pixel columns. With this configuration, a noise can be removed in such a case that the rate of the high intensity pixel exceeds the specific rate only for an instant in the detecting step, so that the winding position of the reinforced fiber can be detected with accuracy.

Further, a position detecting device according to the disclosure is a position detecting device for detecting a winding position of a reinforced fiber impregnated with resin when a plurality of hoop layers is formed in a cylindrical portion of a liner by winding the reinforced fiber around the cylindrical portion in hoop winding with the winding position of the reinforced fiber reciprocating in an axial direction of the liner. The position detecting device includes a lighting assembly, an imaging portion, and a detecting portion. The lighting assembly is configured to illuminate a hoop layer with oblique light from a direction inclined from a central axis of the liner. The imaging portion is configured to take a captured image of the reinforced fiber just after the reinforced fiber is wound around the hoop layer illuminated with oblique light by the lighting assembly, the imaging portion having an optical axis set at the same angle as an optical axis of the lighting assembly around the central axis of the liner. The detecting portion is configured to binarize the captured image taken by the imaging portion into high intensity pixels and low intensity pixels and detecting the winding position of the reinforced fiber based on the number of high intensity pixels or the number of low intensity pixels in each pixel column arranged in the axial direction of the liner in the binarized captured image.

With this configuration, when the hoop layer is illuminated with oblique light by the lighting assembly from the direction inclined from the central axis of the liner, a light reflection region observed by the imaging portion becomes narrow in the fiber direction of the reinforced fiber as the time elapses from the point of winding of the reinforced fiber. In the binarized captured image, the fiber direction of the reinforced fiber corresponds to a column direction of each pixel column arranged in the axial direction of the liner. As compared with the reinforced fiber after time has elapsed sufficiently from the point of winding, the reinforced fiber just after winding appears as a pixel column with a large number of high intensity pixels or a pixel column with a small number of low intensity pixels. Meanwhile, as compared with the reinforced fiber just after winding, the reinforced fiber after time has elapsed sufficiently from the point of winding appears as a pixel column with a small number of high intensity pixels or a pixel column with a large number of low intensity pixels. Therefore, when a plurality of hoop layers is formed, the detecting portion can distinguish the reinforced fiber in a lower layer after time has elapsed sufficiently from the point of winding from the reinforced fiber in an upper layer just after winding, so that the winding position of the reinforced fiber just after winding can be detected from the captured image.

As a more preferable aspect, the imaging portion may take a plurality of captured images of the reinforced fiber just after the reinforced fiber is wound around the hoop layer before and after a return operation of reversing a moving direction of the winding position of the reinforced fiber. The detecting portion may detect an end position of the hoop layer as the winding position of the reinforced fiber from the captured images taken before and after the return operation. With this configuration, the detecting portion can detect the end position of the hoop layer from the captured images taken before and after the return operation with accuracy.

As a more preferable aspect, the position detecting device may further include a determination portion configured to determine whether the end position of the hoop layer falls within a standard range based on a target end position. When the end position of the hoop layer falls within the standard range, the determination portion may continue the hoop winding, and when the end position of the hoop layer deviates from the standard range, the determination portion may stop the hoop winding. With this configuration, the determination portion automatically determines whether or not the end position of the hoop layer deviates from the standard range, during the hoop winding, and when the end position of the hoop layer deviates from the standard range, the manufacture is stopped, so that an operator can perform maintenance at the early stage.

The configuration is not particularly limited, provided that the winding position of the reinforced fiber can be detected. As a more preferable aspect, the detecting portion may calculate a rate of the high intensity pixel for each pixel column in the binarized captured image in order from outside to inside in the axial direction of the liner. The detecting portion may detect the winding position of the reinforced fiber based on a pixel column in which the rate of the high intensity pixel exceeds a specific rate first. With this configuration, the detecting portion can detect the winding position of the reinforced fiber from the rate of the high intensity pixel in each pixel column.

As a more preferable aspect when the winding position of the reinforced fiber is detected based on the specific rate, when the number of continuous pixel columns in which the rate of the high intensity pixel exceeds the specific rate is a specific number or more, the detecting portion may detect the winding position of the reinforced fiber based on the pixel column in which the rate of the high intensity pixel exceeds the specific rate first from among the continuous pixel columns. With this configuration, the detecting portion removes a noise in such a case that the rate of the high intensity pixel exceeds the specific rate only for an instant, so that the winding position of the reinforced fiber can be detected with accuracy.

With the disclosure, the winding position of the reinforced fiber impregnated with resin is detected by use of such a characteristic that a light reflection region observed by the imaging portion becomes narrow in the fiber direction of the reinforced fiber as time elapses just after the reinforced fiber is wound around the liner. Accordingly, it is possible to detect the winding position of the reinforced fiber with accuracy when a plurality of hoop layers is formed on the outer surface of the liner.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
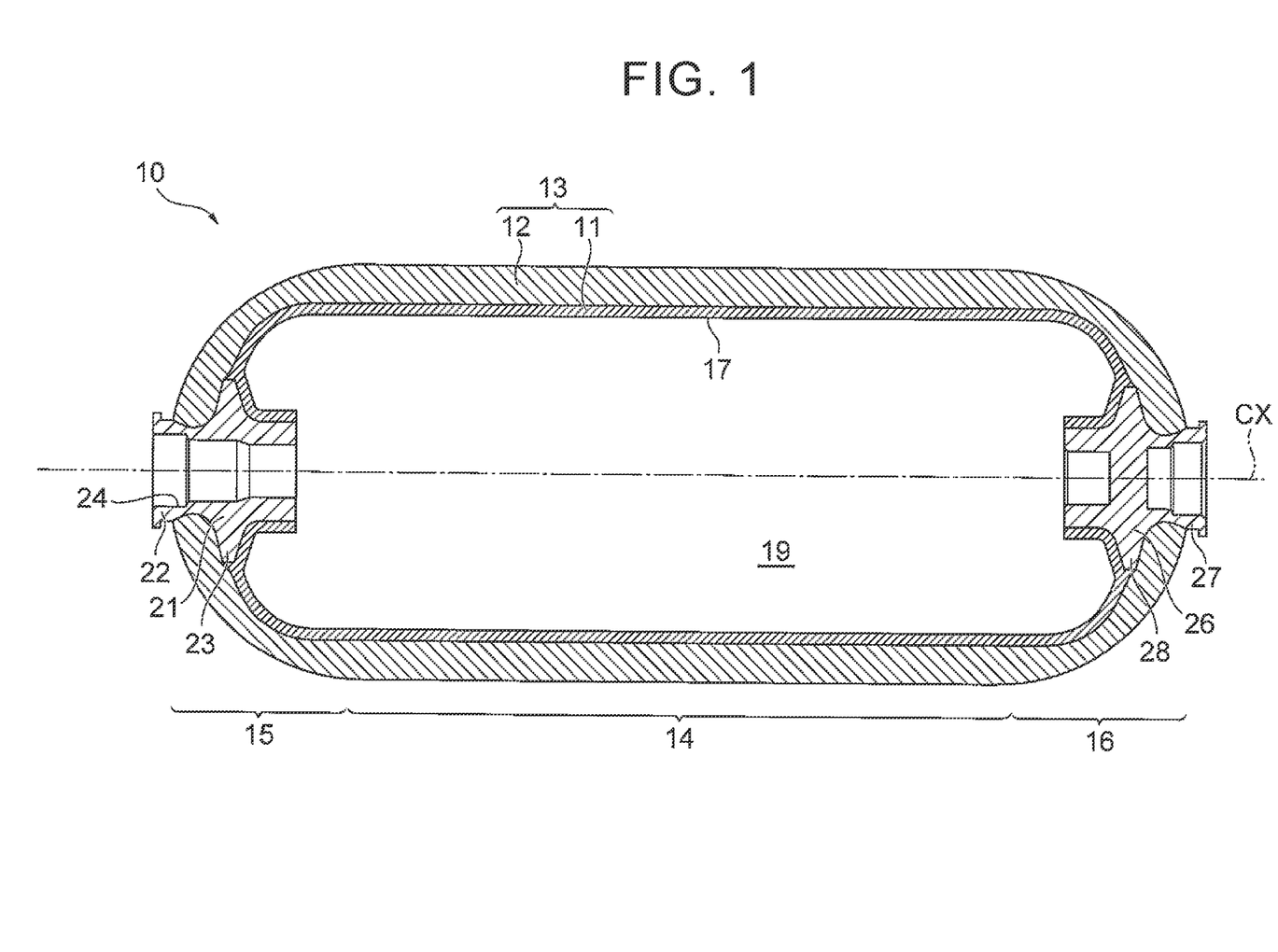
FIG. 1 is a sectional schematic view of a high-pressure tank according to the present embodiment.
Figure 2:
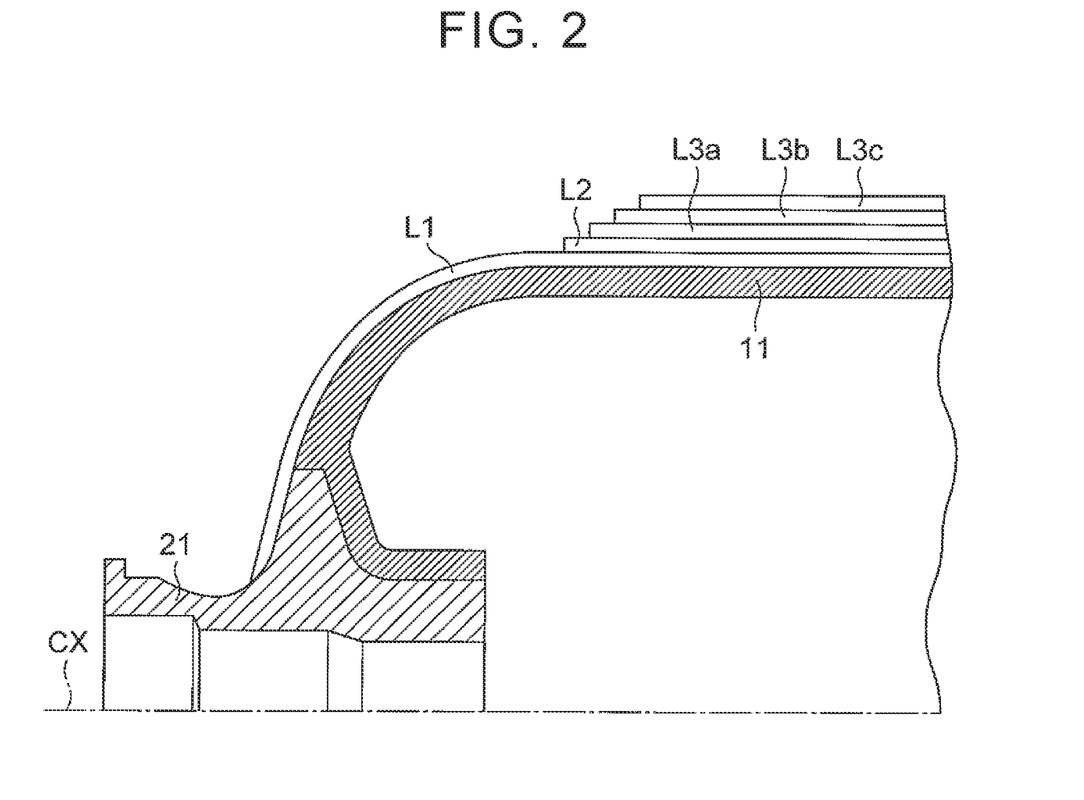
FIG. 2 is an enlarged view of a helical layer and a hoop layer according to the present embodiment.
Figure 3:
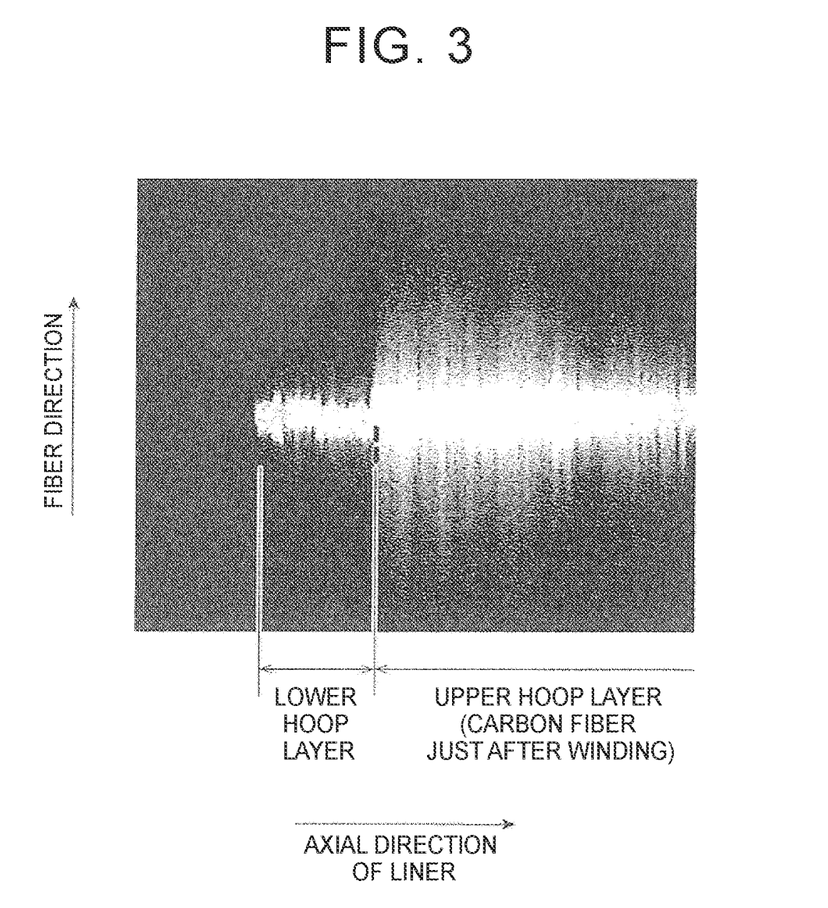
FIG. 3 is a captured image just after winding according to the present embodiment.

Descriptions are now made of the present embodiment. FIG. 1 is a sectional schematic view of a high-pressure tank according to the present embodiment. FIG. 2 is an enlarged view of a helical layer and a hoop layer according to the present embodiment. FIG. 3 is a captured image just after winding according to the present embodiment. Note that the following description deals with a fuel tank in which fuel gas such as hydrogen is stored in an in-vehicle fuel cell system as an example of a high-pressure tank, but the high-pressure tank may be used for any given purposes other than the fuel cell system.

As illustrated in FIG. 1, the high-pressure tank 10 includes a tank main body 13 configured such that the outer surface of a liner 11 as a base material of a tank is coated with a fiber reinforced resin layer 12. The tank main body 13 has an outer surface shape in which a pair of dome portions 15, 16 is provided such that the dome portions 15, 16 swell in a hemispherical shape from the opposite ends of a tubular body portion 14. A pair of mouth pieces 21, 26 is provided such that the mouth pieces 21, 26 are provided in respective vertex parts of the dome portion 15, 16. A through-hole 24 is formed in the first mouth piece 21, and discharge and inflow of gas from and into the tank main body 13 are performed by a valve (not shown) attached to the through-hole 24. No through-hole is formed in the second mouth piece 26, and the tank main body 13 is sealed by the second mouth piece 26.

The liner 11 serves as a base material of the high-pressure tank 10 and is formed in a hollow shape so as to have a storage space 19 for fuel gas. The liner 11 is made of resin having a gas barrier property to the fuel gas. As a resin material of the liner 11, resin such as polyamide, an ethylene vinyl alcohol copolymer, or polyethylene can be used. Various compressed gases such as compressed natural gas (CNG), various liquefied gases such as liquefied natural gas (LNG) and liquefied petroleum gas (LPG), and other various pressurization substances may be filled in the liner 11 as the fuel gas other than hydrogen gas.

The fiber reinforced resin layer 12 is formed such that reinforced fibers impregnated with uncured resin (uncured thermosetting resin) are arranged in parallel in one direction, the reinforced fibers are wound several times around the outer surface of the liner 11, and then, the uncured resin is hardened in a heating furnace. The fiber reinforced resin layer 12 is constituted by a helical layer in which the reinforced fiber is wound around the liner 11 in helical winding, and a hoop layer in which the reinforced fiber is wound around a cylindrical portion 17 of the liner 11 in hoop winding. The helical winding is a winding mode in which the reinforced fiber is wound around the liner 11 in a helical manner. The hoop winding is a winding mode in which the reinforced fiber is wound around the cylindrical portion 17 of the liner 11 in a hoop manner.

When the liner 11 is reinforced by the fiber reinforced resin layer 12 from outside, strength improvement and weight reduction of the high-pressure tank 10 are achieved. As the reinforced fiber, a carbon fiber, a glass fiber, an aramid fiber, and the like can be employed appropriately. Note that the carbon fiber that has a high directivity is used for the hoop layer in the present embodiment. In the present embodiment, thermosetting resin is used for resin with which the reinforced fiber is impregnated, but thermoplastic resin such as nylon may be used. In this case, after the reinforced fiber is wound in a state where the thermoplastic resin is softened, the reinforced fiber is spontaneously cooled so that the thermoplastic resin is rigidified.

The first mouth piece 21 is made of metal such as aluminum or aluminum alloy. The mouth piece 21 is configured such that a flange portion 23 is provided on the outer periphery of a tubular portion 22 serving as a main body, and a part of the tubular portion 22 projects outwardly from the dome portion 15. The second mouth piece 26 is also made of metal such as aluminum or aluminum alloy, similarly to the first mouth piece 21. The mouth piece 26 is configured such that a flange portion 28 is provided on the outer periphery of a tubular portion 27 serving as a main body, and a part of the tubular portion 27 projects outwardly from the dome portion 16. Further, the mouth pieces 21, 26 also function as detection references O based on which end positions of hoop layers L3a to L3c are detected (see FIGS. 2, 6).

As illustrated in FIG. 2, at the time of manufacturing the high-pressure tank 10, a low helical layer L1 is formed in such a manner that a carbon fiber is first wound at a small angle to a central axis CX so as to cover the outer surface of the liner 11. Then, a high helical layer L2 is formed in such a manner that a carbon fiber is wound around the outer surface of the low helical layer at a large angle to the central axis CX so as to cover the cylindrical portion 17 of the liner 11. After that, a carbon fiber is wound around the outer surface of the high helical layer L2 at an angle generally perpendicular to the central axis CX, so that a plurality of hoop layers L3a to L3c is formed into a stepped manner. Since the high helical layer L2 and the hoop layers L3a to L3c are formed in a stepped manner, the dome portions 15, 16 (see FIG. 1) can be appropriately formed in helical winding at the subsequent stage.

At the time when the hoop layers L3a to L3c are formed in the liner 11, it is important to detect the end positions of the hoop layers L3a to L3c in order to manage the strength of the tank. However, when the hoop layers L3a to L3c are formed in a stepped manner, it is difficult to specify the end positions of the hoop layers L3a to L3c from appearance or the like because the hoop layers L3a to L3c are very thin. Further, even if the surface of the carbon fiber is observed by an imaging portion after the hoop layers L3a to L3c are formed, a boundary between an upper layer and a lower layer cannot be distinguished, and therefore, the end positions of the hoop layers L3b, L3c as a second layer and a third layer cannot be detected.

Here, when the carbon fiber just after hoop winding is performed was observed by the imaging portion, it was found that a light reflection region became narrow in a fiber direction of the carbon fiber as time elapsed just after the winding. Reflection light from the carbon fiber has a high directivity, and therefore, in a case where the hoop layer is illuminated with oblique light from a direction perpendicular to the fiber direction, light reflected in a region narrow in the fiber direction on a hoop layer surface is taken into the imaging portion having an optical axis set at the same angle as the optical axis of a lighting assembly around the central axis of the liner 11. Note that the illumination with oblique light is a method of applying light, by the lighting assembly, to a predetermined part from a direction where the optical axis of the lighting assembly diagonally intersects with the optical axis of the imaging portion. However, as illustrated in FIG. 3, in terms of the carbon fiber just after winding, light reflected in a relatively wide region in the fiber direction on the hoop layer surface is also taken into the imaging portion.

This is presumably because, in a course where the carbon fiber impregnated with resin is conveyed by a roller toward the liner 11, air bubbles occur in the resin or turbulence on a resin surface occurs due to friction or the like, so that reflection light is diffusely reflected by the carbon fiber just after winding due to the air bubbles in the resin or the turbulence on the resin surface. After the carbon fiber impregnated with resin is wound around the liner 11, the air bubbles start to be removed from the resin, and the turbulence on the resin surface also starts to become small, so that the diffused reflection of the reflection light on the carbon fiber is gradually restrained as time elapses. On this account, based on the size of the light reflection region in the fiber direction of the carbon fiber, it is possible to distinguish the carbon fiber just after winding from the carbon fiber after time has elapsed from the point of winding.

In view of this, in the present embodiment, a region around an end of the cylindrical portion 17 of the liner 11 is set as an imaging range for the imaging portion, and a captured image of the carbon fiber in the middle of winding is taken while the carbon fiber is passing through the imaging range of the imaging portion. In a case where the hoop layers L3a to L3c are formed, when the carbon fiber in an upper layer is wound, time elapses sufficiently from the point of winding the carbon fiber in a lower layer. Captured images are taken such that a captured image of a reflection region of light from the carbon fiber in the lower layer is taken in a narrow range in the fiber direction, while a captured image of a reflection region of light from the carbon fiber just after winding is taken in a wide range in the fiber direction. Accordingly, by use of a difference between the captured images in terms of the light reflection region in the fiber direction, the end positions of the hoop layers L3a to L3c (see FIG. 2) can be detected during hoop winding.

Figure 4:
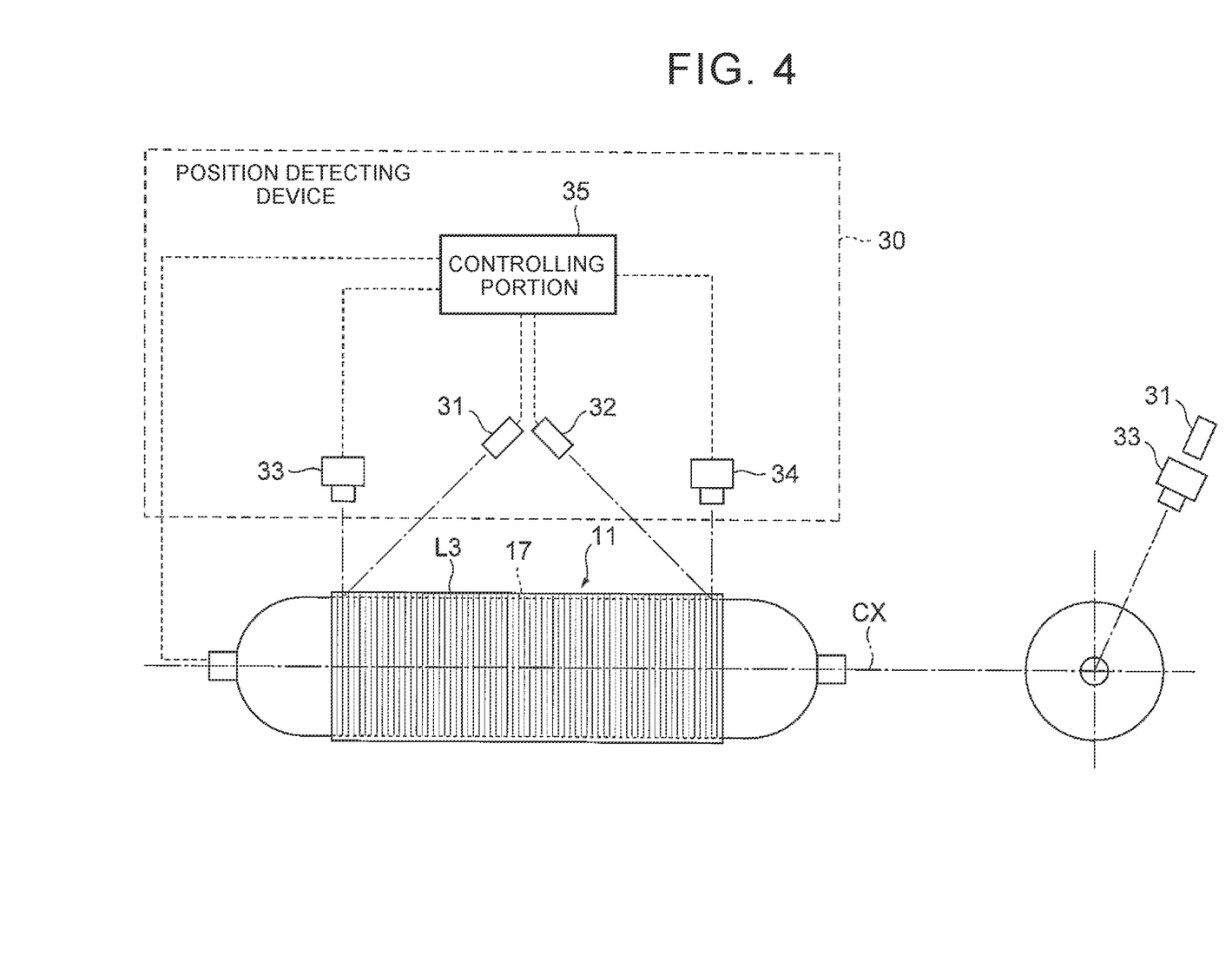
FIG. 4 is a configuration diagram of a position detecting device of the present embodiment.

With reference to FIG. 4, the following describes a position detecting device in the present embodiment. FIG. 4 is a configuration diagram of the position detecting device of the present embodiment. Note that FIG. 4 illustrates one example of the position detecting device, and the position detecting device can be modified appropriately. Further, FIG. 4 illustrates a state where at least a first hoop layer is formed in the cylindrical portion of the liner.

As illustrated in FIG. 4, a position detecting device 30 is provided with a pair of lighting assemblies 31, 32 configured to apply oblique light to regions around the ends of the cylindrical portion 17 in a direction toward the outer side in the axial direction of the liner 11, and a pair of imaging portions 33, 34 configured to capture images of the regions around the ends of the cylindrical portion 17. Angles of optical axes of the lighting assemblies 31, 32 are adjusted to between 40 degrees and 50 degrees from the central axis CX of the liner 11, and angles of optical axes of the imaging portions 33, 34 are adjusted to 90 degrees from the central axis CX of the liner 11. Further, the lighting assemblies 31, 32 and the imaging portions 33, 34 are placed such that the angles of the optical axes of the lighting assemblies 31, 32 and the imaging portions 33, 34 become the same around the central axis CX of the liner 11, and the lighting assemblies 31, 32 and the imaging portions 33, 34 are placed at the same phase position in the rotation direction of the liner 11. That is, the optical axes of the lighting assemblies 31, 32 and the imaging portions 33, 34 are included in a virtual plane including the central axis CX of the liner 11. Note that it is not necessary for the optical axes of the imaging portions 33, 34 to be completely the same as the optical axes of the lighting assemblies 31, 32 around the central axis CX, and their angles may deviate from each other to such an extent that they can be considered to be substantially the same.

When a lower hoop layer is illuminated with oblique light by the lighting assemblies 31, 32 from directions inclined from the central axis CX of the liner 11 during hoop winding, light from a direction perpendicular to the fiber direction of the carbon fiber is reflected by the carbon fiber toward the imaging portions 33, 34. At this time, the carbon fiber in the lower hoop layer and the carbon fiber in the upper layer just after winding are included in the imaging ranges of the imaging portions 33, 34, so that captured images including the carbon fiber in the lower layer after time has elapsed sufficiently from the point of winding and the carbon fiber in the upper layer just after winding are taken. In the captured images, a reflection region of light from the carbon fiber in the lower layer appears in a narrow range in the fiber direction, while a reflection region of light from the carbon fiber in the upper layer just after winding appears in a wide range in the fiber direction. As such, images of the carbon fiber just after the carbon fiber is wound around the lower hoop layer, illuminated with oblique light by the lighting assemblies 31, 32, are captured by the imaging portions 33, 34.

Note that the imaging portions 33, 34 take captured images during winding of the carbon fiber around the cylindrical portion 17 of the liner 11. The imaging portions 33, 34 may capture a dynamic image and may capture a still image. In a case where the imaging portions 33, 34 capture a dynamic image, a plurality of still images is taken out from the dynamic image as captured images. In a case where the imaging portions 33, 34 capture a still image, the imaging portions 33, 34 take a captured image at a winding position of the carbon fiber within one second from the point of time when the carbon fiber is wound around the cylindrical portion 17 of the liner 11. When a captured image is taken at the point of time after one second from the point of winding, the reflection region of light from the carbon fiber in the upper layer becomes narrow, so that it is difficult to distinguish the carbon fiber in the upper layer from the carbon layer in the lower layer. Accordingly, to take a captured image of the carbon fiber just after winding around the lower hoop layer indicates to take a captured image of the carbon fiber within one second after the carbon fiber makes contact with the lower hoop layer.

A controlling portion (a detecting portion, a determination portion) 35 configured to detect the winding position of the carbon fiber from a captured image is connected to the imaging portions 33, 34. The controlling portion 35 binarizes the captured image into high intensity pixels and low intensity pixels and detects the winding position of the carbon fiber based on the number of high intensity pixels in each pixel column arranged in the axial direction of the liner in the binarized captured image. In this case, reflection light strongly reflected from the carbon fiber is shown as a high intensity pixel, and other reflection light is shown as a low intensity pixel. A processing method of the binarization process is not limited particularly, and for example, a threshold specification method, a P-tile method, or a modal method can be used. Note that details of the position detecting process by the controlling portion 35 will be described later.

Further, the controlling portion 35 detects an end position of the hoop layer from the winding position of the carbon fiber and determines whether the end position of the hoop layer falls within a standard range based on a target end position. In addition to the position detecting process and the determination process, the controlling portion 35 controls an operation of an abutment joint (not shown) configured to guide the carbon fiber to the outer surface of the liner 11, the rotation of the liner 11, lighting timings of the lighting assemblies 31, 32, imaging timings of the imaging portions 33, 34, and so on, for example. Various processes of the controlling portion 35 are performed such that a processor reads and executes a program stored in a memory, for example. As the memory, one or more of storage media such as a read only memory (ROM) and a random access memory (RAM) are used in accordance with purposes. Further, the controlling portion 35 is configured to perform the position detecting process, but a detecting portion for the position detecting process may be provided separately from the controlling portion 35. Similarly, the controlling portion 35 is configured to perform the determination process, but a determination portion for the determination process may be provided separately from the controlling portion 35.

Figure 5:
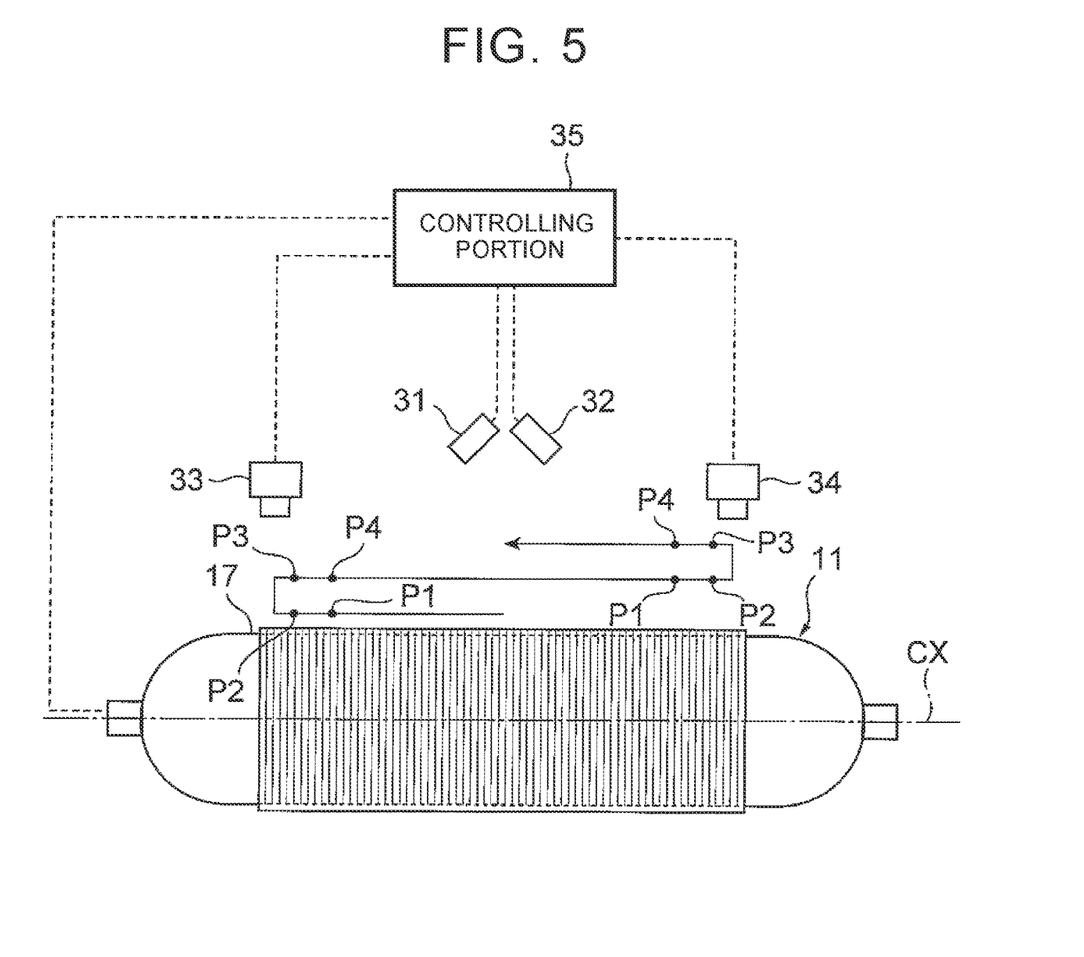
FIG. 5 is a view illustrating one example of an imaging step in the present embodiment.
Figure 6:
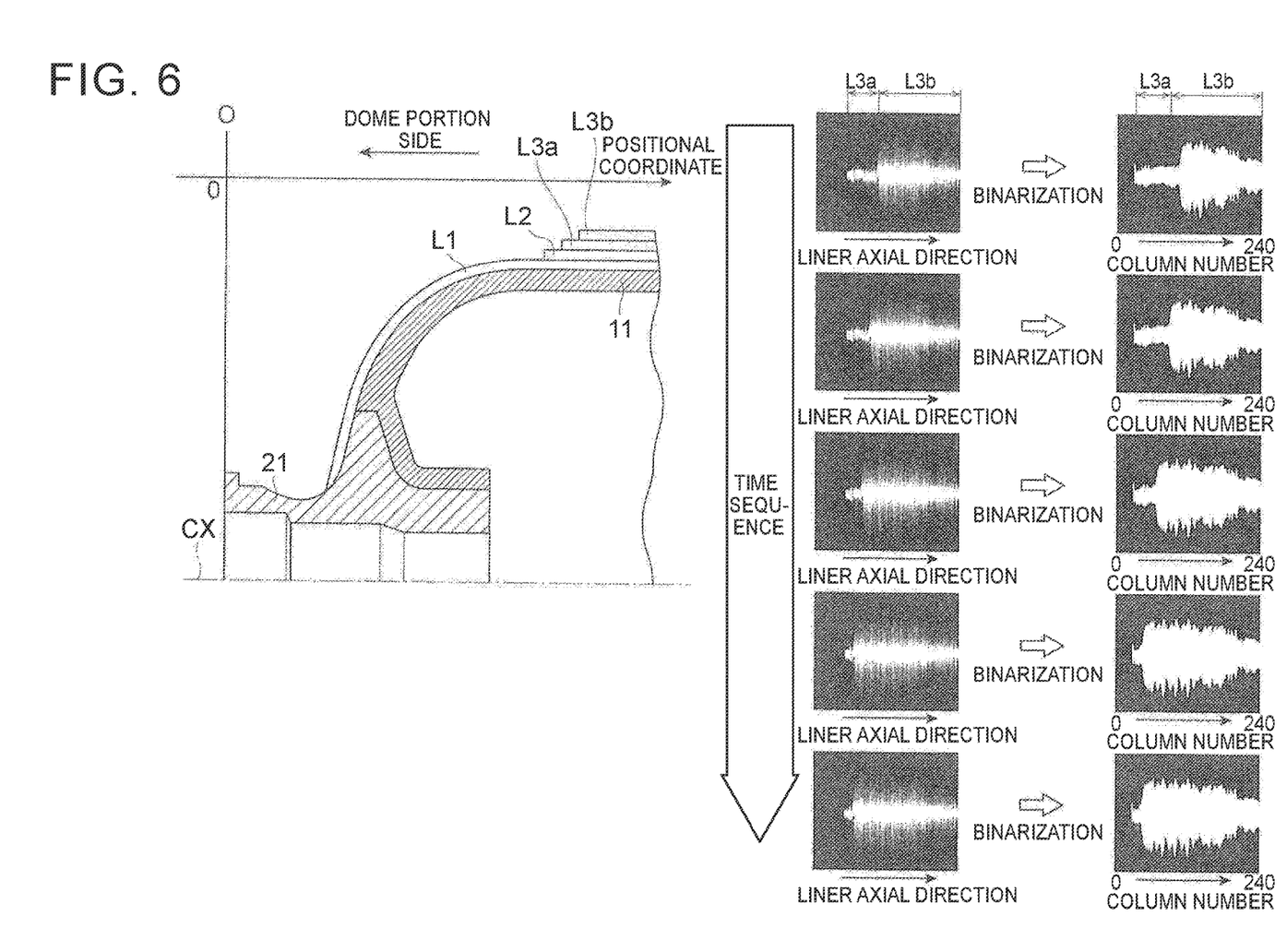
FIG. 6 is a view illustrating one example of a detecting step in the present embodiment.
Figure 7:
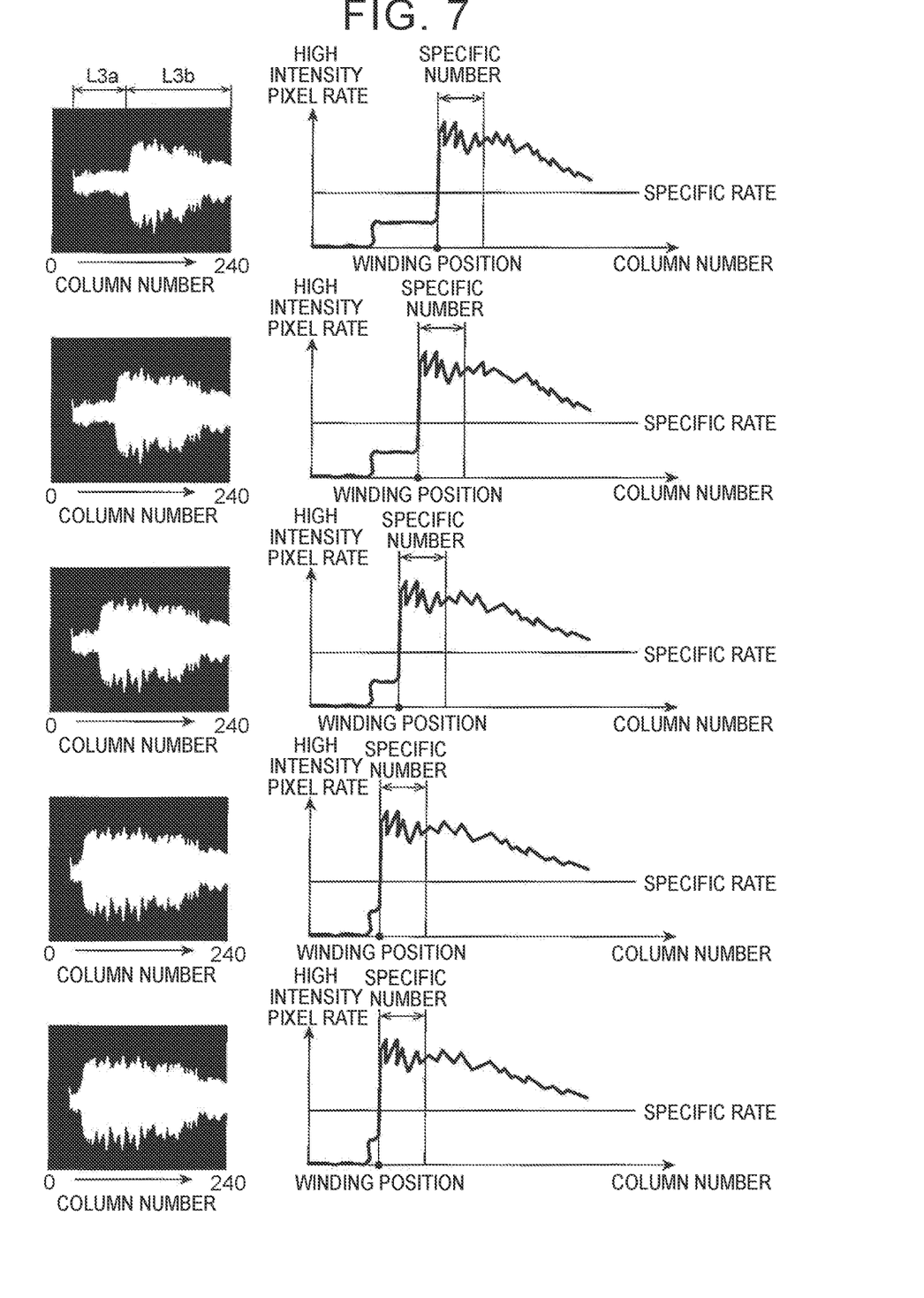
FIG. 7 is a view illustrating one example of the detecting step in the present embodiment.

With reference to FIGS. 5 to 7, the position detecting method for the winding position will be described. FIG. 5 is a view illustrating one example of an imaging step in the present embodiment. FIG. 6 is a view illustrating one example of a detecting step in the present embodiment. FIG. 7 is a view illustrating one example of the detecting step in the present embodiment. Note that the first hoop layer is formed in the cylindrical portion of the liner.

Imaging Step

As illustrated in FIG. 5, in the hoop winding, the winding position of the carbon fiber impregnated with resin reciprocates in the axial direction of the liner 11. One operation of the hoop winding is performed such that the winding position of the carbon fiber is moved from the central position in the axial direction of the liner 11 to a first end of the cylindrical portion 17, the winding position of the carbon fiber is moved from the first end of the cylindrical portion 17 to a second end thereof, the winding position of the carbon fiber is returned to the central position in the axial direction of the liner 11 from the second end of the cylindrical portion 17, and here, the operation is finished. At this time, in the opposite ends of the cylindrical portion 17, a return operation in which the moving direction of the winding position of the carbon fiber is reversed is performed, and before and after this return operation, images of the carbon fiber just after the carbon fiber is wound around the hoop layer L3a (see FIG. 6) are captured by the imaging portions 33, 34.

More specifically, on an operation path of the abutment joint (not shown) configured to guide the carbon fiber to the outer surface of the liner 11, a lighting-ON position P1, a lighting-OFF position P4, an imaging start position P2, and an imaging end position P3 are set in the controlling portion 35 as a set file. The lighting-ON position P1 is set in the middle of the movement of the abutment joint from the central position in the axial direction of the liner 11 to the first end of the cylindrical portion 17, and the imaging start position P2 is set just before the return operation of the abutment joint. The imaging end position P3 is set just after the return operation of the abutment joint, and the lighting-OFF position P4 is set in the middle of the movement of the abutment joint from the first end of the cylindrical portion 17 to the central position in the axial direction of the liner 11. Further, a current position of the abutment joint during the movement is input into the controlling portion 35.

When the abutment joint moves to the lighting-ON position P1, a lighting-ON command is output from the controlling portion 35 to the lighting assembly 31. Hereby, a switch of the lighting assembly 31 is turned on in the middle of the movement of the winding position of the carbon fiber from the central position in the axial direction of the liner 11 to the first end of the cylindrical portion 17, so that a region around the first end of the cylindrical portion 17 (the vicinity of the end position of the lower hoop layer L3a) is illuminated with oblique light by the lighting assembly 31. Then, when the abutment joint moves to the imaging start position P2, an imaging start command is output from the controlling portion 35 to the imaging portion 33. Hereby, just before the winding position of the carbon fiber arrives at the first end of the cylindrical portion 17, that is, just before the return operation, imaging of the carbon fiber in the region around the first end of the cylindrical portion 17 by the imaging portion 33 is started. At this time, the carbon fiber is illuminated with oblique light by the lighting assembly 31 from the direction perpendicular to the fiber direction, and light reflected upward from the carbon fiber is taken into the imaging portion 33.

Subsequently, when the abutment joint moves to the imaging end position P3, an imaging end command is output from the controlling portion 35 to the imaging portion 33. Hereby, after the moving direction of the winding position of the carbon fiber is reversed, that is, just after the return operation, the imaging of the carbon fiber in the region around the first end of the cylindrical portion 17 by the imaging portion 33 is ended. The frame rate of the imaging portion 33 is, for example, 10 fps, desirably 100 fps, and from the start of the return operation to the end of the return operation, a plurality of captured images is taken in terms of the carbon fiber in the middle of winding around the lower hoop layer L3a. When the abutment joint moves to the lighting-OFF position P4, a lighting-OFF command is output from the controlling portion 35 to the lighting assembly 31. Hereby, the switch of the lighting assembly 31 is turned off in the middle of the movement of the winding position of the carbon fiber from the first end of the cylindrical portion 17 to the central position in the axial direction of the liner 11. As such, a timing when the winding position of the carbon fiber goes in and out from the imaging range of the imaging portion 33 is predicted from the operation of the abutment joint, and the timings of imaging start, imaging end, lighting-ON, and lighting-OFF are controlled. Note that, on the second end side of the cylindrical portion 17, images of the carbon fiber in the middle of winding around the lower hoop layer L3*a* are also captured in a similar manner.

Detecting Step

As illustrated in FIG. 6, the carbon fiber has a high directivity of reflection light, and the reflection light from the carbon fiber is shown strongly in the captured images. In each of the captured images, light is reflected from the carbon fiber just after winding in a wide range in the fiber direction due to diffused reflection, and light is reflected in a narrow range in the fiber direction from the carbon fiber after time has elapsed sufficiently from the point of winding. That is, the carbon fiber with a wide reflection region in the fiber direction indicates the carbon fiber in the upper layer (the hoop layer L3*b*) just after winding, and the carbon fiber with a narrow reflection region in the fiber direction indicates the carbon fiber in the lower layer (the hoop layer L3*a*) after time has elapsed sufficiently from the point of winding. The captured images show a state where, after the winding position of the carbon fiber approaches the end position of the lower hoop layer L3*a*, the winding position of the carbon fiber is distanced from the end position of the lower hoop layer L3*a* by the return operation.

When the binarization process is performed on the captured images, a region where light is strongly reflected from the carbon fiber appears as white high intensity pixels on the binarized captured images, and other regions appear as black low intensity pixels. In the binarized captured image, pixel columns constituted each by pixels in the fiber direction of the carbon fiber are arranged in the axial direction of the liner 11, and each of the pixel columns is constituted by white high intensity pixels and black low intensity pixels. Further, in the pixel columns in the binarized captured image, column numbers are sequentially set from outside to inside in the axial direction of the liner 11, and a column number corresponds to a position coordinate in a coordinate system that takes the detection reference O of the mouth piece 21 as an origin.

Note that the binarization process on a captured image may be performed such that a predetermined region is taken out from the captured image and the binarization process is performed only on the predetermined region, or the binarization process is performed on the whole captured image. Further, the binarization process may be performed on all the captured images, or the binarization process may be performed on some of the captured images. For example, the binarization process may be performed only on captured images excluding captured images at the imaging start and the imaging end from the captured images. Hereby, a process burden of the binarization process can be reduced. Further, the coordinate system that takes the detection reference O of the mouth piece 21 as the origin is set in the captured images, but a coordinate system that takes another position as the origin may be set in the captured images.

As illustrated in FIG. 7, in terms of the binarized captured image, the rate of the white high intensity pixel is calculated for each pixel column in order from an outer column number to an inner column number in the axial direction of the liner 11. The rate of the high intensity pixel is calculated, for example, as the rate of the high intensity pixel in constituent pixels of the pixel column. A pixel column with a low rate of the high intensity pixel indicates the carbon fiber in the lower layer (the hoop layer L3*a*) after time has elapsed sufficiently from the point of winding, and a pixel column with a high rate of the high intensity pixel indicates the carbon fiber in the upper layer (the hoop layer L3*b*) just after winding. As such, the carbon fiber in the lower layer after time has elapsed sufficiently from the point of winding and the carbon fiber in the upper layer just after winding are identified based on the number of high intensity pixels in the pixel columns arranged in the axial direction of the liner.

The rate of the high intensity pixel is compared with a specific rate per pixel column, and the number of continuous pixel columns in which the rate of the high intensity pixel exceeds the specific rate is counted. In a case where the number of continuous pixel columns in which the rate of the high intensity pixel exceeds the specific rate is a specific number or more, the winding position of the carbon fiber is detected based on an endmost pixel column among these continuous pixel columns. That is, the winding position of the carbon fiber is detected based on a pixel column in which the rate of the high intensity pixel exceeds the specific rate first. Hereby, a pixel column nearest to the end position of the lower hoop layer L3*a* in the binarized captured image is detected as the winding position of the carbon fiber. As described above, since the pixel column of the captured image corresponds to the position coordinate, the winding position of the carbon fiber is detected by converting the column number of the pixel column into the position coordinate.

Note that the specific rate should be a value based on which the carbon fiber in the upper layer just after winding can be distinguished from the carbon fiber in the lower layer after time has elapsed sufficiently from the point of winding, and the specific number should be a value based on which a noise can be removed in such a case that the rate of the high intensity pixel exceeds the specific rate only for an instant. For the specific rate and the specific number, values found experimentally, empirically, or theoretically from past data or the like are used. Further, in the present embodiment, the winding position of the carbon fiber is detected from the rate of the white high intensity pixel in the binarized captured image, but the winding position of the carbon fiber can be also detected from the rate of the black low intensity pixel.

Among winding positions of the carbon fiber that are detected from the captured images, a winding position closest to the dome portion 15 is detected as the end position of the hoop layer L3*b*. For example, among the winding positions of the carbon fiber in the captured images, a winding position at which the column number of the pixel column or the coordinate position is smallest is detected as the end position of the hoop layer L3*b*. Note that an average value of the winding positions of the carbon fiber that are detected from the captured images may be detected as the end position of the hoop layer L3*b*. Further, an operator may detect the end position of the hoop layer L3*b* from the winding positions of the carbon fiber in the captured images. Thus, the end position of the hoop layer L3*b* is detected from the captured images taken before and after the return operation.

Determination Step

When the end position of the hoop layer L3*b* (see FIG. 6) is detected, it is determined whether the end position of the hoop layer L3*b* falls within the standard range based on the target end position or not. When the end position of the hoop layer L3*b* falls within the standard range, the hoop winding is continued, and when the end position of the hoop layer L3*b* deviates from the standard range, abnormality is notified, and the hoop winding is stopped. Hereby, it is possible to automatically determine the abnormality of the end position of the hoop layer L3*b* during the hoop winding. The abnormality includes a case where the end position of the upper hoop layer L3b protrudes outward from the end position of the lower hoop layer L3a and a case where the end position of the upper hoop layer L3b is too close to the end position of the lower hoop layer L3a. When the end position of the hoop layer L3b deviates from the standard range, the manufacture is stopped, so that the operator can perform maintenance at the early stage. The notification of the abnormality may be performed by use of at least one of voice notification, display notification, and light emission notification, for example. Further, the standard range is a standard range based on a target value of the end position of each hoop layer, and a value found experimentally, empirically, or theoretically from past data or the like is used.

Figure 8:
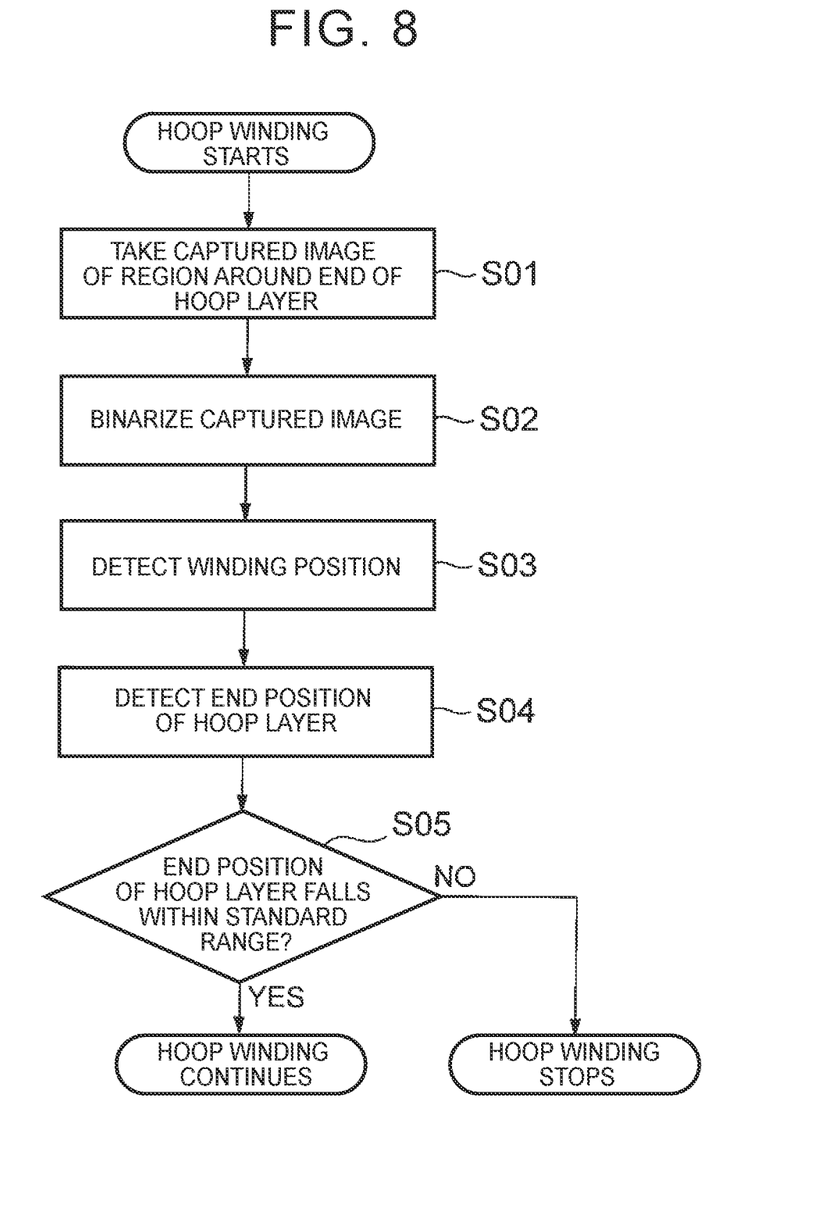
FIG. 8 is a flowchart illustrating one example of a position detecting process in the present embodiment.

With reference to FIG. 8, the following describes the procedure of the position detecting method for the winding position. FIG. 8 is a flowchart illustrating one example of the position detecting process of the present embodiment. Note that the flowchart in FIG. 8 illustrates a position detecting process in the hoop winding at the time of forming the second hoop layer.

As illustrated in FIG. 8, when the hoop winding of the second hoop layer L3b is started, the carbon fiber impregnated with resin is wound around the cylindrical portion 17 of the liner 11. The regions around the ends of the first hoop layer L3a are illuminated with oblique light by the lighting assemblies 31, 32, and images of the carbon fiber just after the carbon fiber has been wound around the hoop layer L3a illuminated with oblique light are captured by the imaging portions 33, 34 before and after the return operation (step S01). Subsequently, the controlling portion 35 performs the binarization process on a plurality of captured images so that the captured images are binarized into white high intensity pixels and black low intensity pixels (step S02). In the binarized captured images, the carbon fiber just after winding appears as pixel columns with a large number of high intensity pixels as compared with the carbon fiber after time has elapsed sufficiently from the point of winding. Further, the carbon fiber after time has elapsed sufficiently from the point of winding appears as pixel columns with a small number of high intensity pixels as compared with the carbon fiber just after winding.

Then, the controlling portion 35 detects the winding position of the carbon fiber from the binarized captured images (step S03). The rate of the high intensity pixel is calculated for each pixel column in order from a smaller column number in each of the captured images, and when the number of continuous pixel columns in which the rate of the high intensity pixel exceeds the specific rate is the specific number or more, the winding position of the carbon fiber is detected based on a smallest column number (a pixel column in which the rate of the high intensity pixel exceeds the specific rate first) in the continuous pixel columns. Subsequently, the controlling portion 35 detects the end position of the second hoop layer L3b from the winding positions of the carbon fiber that are detected from the captured images (step S04). From among the winding positions of the carbon fiber that are detected from the captured images, the winding position closest to the dome portion 15 or the average value of the winding positions is detected as the end position of the hoop layer L3b.

Subsequently, the controlling portion 35 determines whether or not the end position of the hoop layer L3b falls within the standard range (step S05). When the end position of the hoop layer L3b falls within the standard range (YES in step S05), the hoop winding of the carbon fiber is continued even after the return operation. Meanwhile, when the end position of the hoop layer L3b deviates from the standard range (NO in step S05), the hoop winding of the carbon fiber is stopped during the return operation, and abnormality is notified to the operator. As such, from the captured images before and after the return operation, the end position of the hoop layer L3b is detected in real time during the hoop winding, and the abnormality in the end position of the hoop layer L3b is determined.

As described above, in the position detecting method of the present embodiment, at time when a plurality of hoop layers is formed, the carbon fiber in the lower layer after time has elapsed sufficiently from the point of winding and the carbon fiber in the upper layer just after winding are distinguished from each other. Accordingly, the winding position of the carbon fiber just after winding can be detected from the captured image. Further, by detecting the winding position of the carbon fiber just after winding from the captured images taken before and after the return operation, it is possible to detect the end position of the hoop layer during the winding of the hoop layer with accuracy.

Note that the present embodiment deals with the carbon fiber as the reinforced fiber, but the reinforced fiber may be any fiber, provided that the fiber has a high directivity of reflection light.

Further, in the present embodiment, when the number of continuous pixel columns in which the rate of the high intensity pixel exceeds the specific rate is the specific number or more, the winding position of the carbon fiber is detected based on a pixel column in which the rate of the high intensity pixel exceeds the specific rate first from among the continuous pixel columns. However, the disclosure is not limited to the configuration. The winding position of the carbon fiber should be detected based on the number of high intensity pixels or the number of low intensity pixels in each pixel column in the binarized captured image. For example, the winding position of the carbon fiber may be detected based on a difference between adjacent pixel columns in terms of the rate of the high intensity pixel or the low intensity pixel. In this case, a part with a largest difference in the rate of the high intensity pixel or the low intensity pixel between the adjacent pixel columns is detected as the winding position of the carbon fiber. Further, in the present embodiment, the winding position of the carbon fiber is detected by comparing the rate of the high intensity pixel with the specific rate in each pixel column, but the winding position of the carbon fiber may be detected by comparing the number of high intensity pixels with the specific number in each pixel column.

Further, in the present embodiment, the controlling portion detects the winding position of the carbon fiber. However, the disclosure is not limited to the configuration. The operator may determine the winding position of the carbon fiber based on the binarized captured image.

Further, in the present embodiment, the end position of the hoop layer is detected. However, the disclosure is not limited to the configuration. The winding position of the carbon fiber may be continuously detected from a winding start of the hoop winding to a winding end thereof. In this case, the lighting assemblies and the imaging portions are configured to move along with movement of the winding position of the carbon fiber.

Further, in the present embodiment, the controlling portion determines whether the end position of the hoop layer has an abnormality or not. However, the disclosure is not limited to the configuration. The operator may determine the end position of the hoop winding based on the winding positions of the carbon fiber that are detected from the captured images.

Further, a program of the position detecting process of the present embodiment may be stored in a storage medium. The storage medium is not limited in particular and may be a non-transient storage medium such as an optical disk, a magneto-optical disk, or a flash memory.

Further, the present embodiment has been described above, but the embodiment and its modifications may be entirely or partially combined as other embodiments. Further, a technical range of this disclosure is not limited to the present embodiment and may be changed, replaced, or modified variously within a range that does not deviate from the purpose of the technical idea. Furthermore, if the technical idea can be achieved in other methods by a technological progress or another technology derived from the technology, the technical idea may be carried out by the methods. Accordingly, Claims cover all embodiments that can be included in the technical idea.

What is claimed is:

1. A position detecting method for detecting a winding position of a reinforced fiber impregnated with resin when a plurality of hoop layers is formed in a cylindrical portion of a liner by winding the reinforced fiber around the cylindrical portion in hoop winding with the winding position of the reinforced fiber reciprocating in an axial direction of the liner, the position detecting method comprising:
    an imaging step of illuminating, by a lighting assembly, a hoop layer with oblique light from a direction inclined from a central axis of the liner and taking, by an imaging portion, a captured image of the reinforced fiber just after the reinforced fiber is wound around the hoop layer illuminated with oblique light by the lighting assembly, the imaging portion having an optical axis set at the same angle as an optical axis of the lighting assembly around the central axis of the liner; and
    a detecting step of binarizing the captured image taken by the imaging portion to high intensity pixels and low intensity pixels and detecting the winding position of the reinforced fiber based on the number of high intensity pixels or the number of low intensity pixels in each pixel column arranged in the axial direction of the liner in the binarized captured image.

2. The position detecting method according to claim 1, wherein:
    in the imaging step, a plurality of captured images of the reinforced fiber just after the reinforced fiber is wound around the hoop layer is taken before and after a return operation of reversing a moving direction of the winding position of the reinforced fiber; and
    in the detecting step, an end position of the hoop layer is detected as the winding position of the reinforced fiber from the captured images taken before and after the return operation.

3. The position detecting method according to claim 1, further comprising a determination step of determining whether the end position of the hoop layer falls within a standard range based on a target end position, wherein, in the determination step, when the end position of the hoop layer falls within the standard range, the hoop winding is continued, and when the end position of the hoop layer deviates from the standard range, the hoop winding is stopped.

4. The position detecting method according to claim 1, wherein:
    in the detecting step, a rate of the high intensity pixel is calculated for each pixel column in the binarized captured image in order from outside to inside in the axial direction of the liner; and
    the winding position of the reinforced fiber is detected based on a pixel column in which the rate of the high intensity pixel exceeds a specific rate first.

5. The position detecting method according to claim 4, wherein, in the detecting step, when the number of continuous pixel columns in which the rate of the high intensity pixel exceeds the specific rate is a specific number or more, the winding position of the reinforced fiber is detected based on the pixel column in which the rate of the high intensity pixel exceeds the specific rate first from among the continuous pixel columns.

6. A position detecting device for detecting a winding position of a reinforced fiber impregnated with resin when a plurality of hoop layers is formed in a cylindrical portion of a liner by winding the reinforced fiber around the cylindrical portion in hoop winding with the winding position of the reinforced fiber reciprocating in an axial direction of the liner, the position detecting device comprising:
    a lighting assembly configured to illuminate a hoop layer with oblique light from a direction inclined from a central axis of the liner;
    an imaging portion configured to take a captured image of the reinforced fiber just after the reinforced fiber is wound around the hoop layer illuminated with oblique light by the lighting assembly, the imaging portion having an optical axis set at the same angle as an optical axis of the lighting assembly around the central axis of the liner; and
    a detecting portion configured to binarize the captured image taken by the imaging portion into high intensity pixels and low intensity pixels and to detect the winding position of the reinforced fiber based on the number of high intensity pixels or the number of low intensity pixels in each pixel column arranged in the axial direction of the liner in the binarized captured image.

7. The position detecting device according to claim 6, wherein:
    the imaging portion takes a plurality of captured images of the reinforced fiber just after the reinforced fiber is wound around the hoop layer before and after a return operation of reversing a moving direction of the winding position of the reinforced fiber; and
    the detecting portion detects an end position of the hoop layer as the winding position of the reinforced fiber from the captured images taken before and after the return operation.

8. The position detecting device according to claim 6, further comprising a determination portion configured to determine whether the end position of the hoop layer falls within a standard range based on a target end position, wherein, when the end position of the hoop layer falls within the standard range, the determination portion continues the hoop winding, and when the end position of the hoop layer deviates from the standard range, the determination portion stops the hoop winding.

9. The position detecting device according to claim 6, wherein:
    the detecting portion calculates a rate of the high intensity pixel for each pixel column in the binarized captured image in order from outside to inside in the axial direction of the liner; and the detecting portion detects the winding position of the reinforced fiber based on a pixel column in which the rate of the high intensity pixel exceeds a specific rate first.

10. The position detecting device according to claim 9, wherein, when the number of continuous pixel columns in which the rate of the high intensity pixel exceeds the specific rate is a specific number or more, the detecting portion detects the winding position of the reinforced fiber based on the pixel column in which the rate of the high intensity pixel exceeds the specific rate first from among the continuous pixel columns.

* * * * *